United States Patent
Zhao et al.

(10) Patent No.: US 10,582,577 B2
(45) Date of Patent: Mar. 3, 2020

(54) LED DRIVE CIRCUIT

(71) Applicant: Silergy Semiconductor Technology (Hangzhou) Ltd., Hangzhou (CN)

(72) Inventors: Chen Zhao, Hangzhou (CN); Xiaodong Huang, Hangzhou (CN)

(73) Assignee: SILERGY SEMICONDUCTOR TECHNOLOGY (HANGZHOU) LTD., Hangzhou (CN)

(*) Notice: Subject to any disclaimer, the term of this patent is extended or adjusted under 35 U.S.C. 154(b) by 30 days.

(21) Appl. No.: 15/714,108

(22) Filed: Sep. 25, 2017

(65) Prior Publication Data

US 2018/0092171 A1    Mar. 29, 2018

(30) Foreign Application Priority Data

Sep. 28, 2016  (CN) .......................... 2016 1 0858781

(51) Int. Cl.
*H05B 33/08*    (2020.01)

(52) U.S. Cl.
CPC ....... *H05B 33/0812* (2013.01); *H05B 33/086* (2013.01); *H05B 33/0815* (2013.01); *H05B 33/0818* (2013.01); *H05B 33/0824* (2013.01); *H05B 33/0827* (2013.01); *H05B 33/0848* (2013.01)

(58) Field of Classification Search
CPC ............ H05B 33/0812; H05B 33/0815; H05B 33/0827; H05B 33/083; H05B 33/0845
USPC ......................................... 315/186, 192, 193
See application file for complete search history.

(56) References Cited

U.S. PATENT DOCUMENTS

| | | | |
|---|---|---|---|
| 8,766,550 B1* | 7/2014 | Yoon .................... | H05B 33/083 |
| | | | 315/200 R |
| 9,167,643 B2 | 10/2015 | Xu et al. | |
| 9,288,850 B2* | 3/2016 | Yu ....................... | H05B 33/0806 |
| 9,420,644 B1* | 8/2016 | Shum ................... | H05B 33/089 |
| 9,699,840 B2 | 7/2017 | Xu et al. | |
| 2013/0002159 A1 | 1/2013 | Chen et al. | |
| 2013/0127350 A1* | 5/2013 | Frias, Sr. ........... | H05B 33/0806 |
| | | | 315/191 |

(Continued)

FOREIGN PATENT DOCUMENTS

| | | |
|---|---|---|
| CN | 102984855 A | 3/2013 |
| CN | 103152946 A | 6/2013 |
| CN | 1051001543 A | 11/2015 |

*Primary Examiner* — Tung X Le
(74) *Attorney, Agent, or Firm* — Westman, Champlin & Koehler, P.A.

(57) ABSTRACT

Disclosed an LED drive circuit, which is configured to switch the connection of a plurality of LED loads between parallel connection and series connection. When an input voltage is low, the LED loads are controlled to be in parallel connection, and the transistors provided on corresponding parallel branch circuits are controlled to operate in a linear state for regulating the current flowing through the parallel branch circuits. When the input voltage increases, the LED loads or LED drive modules are controlled to be in series connection, and the transistors provided on the series branch circuits are controlled to regulate the current flowing through all the LED loads. Accordingly, on one hand, all the LED loads have a same operating time, on the other hand, all the LED loads operate during most time of every operating cycle, which improves the lifetime of the circuit and the utilization of the LED loads.

21 Claims, 11 Drawing Sheets

(56) References Cited

U.S. PATENT DOCUMENTS

| | | | |
|---|---|---|---|
| 2013/0200802 A1* | 8/2013 | Sakuragi | H05B 37/02 |
| | | | 315/122 |
| 2013/0200812 A1* | 8/2013 | Radermacher | H05B 33/0824 |
| | | | 315/186 |
| 2015/0042234 A1* | 2/2015 | Lee | H05B 33/0824 |
| | | | 315/193 |
| 2015/0366022 A1* | 12/2015 | Li | H05B 33/0809 |
| | | | 315/119 |
| 2017/0027030 A1 | 1/2017 | Wang et al. | |
| 2018/0069483 A1* | 3/2018 | Akiyama | H01L 33/00 |

* cited by examiner

LED DRIVE CIRCUIT

CROSS-REFERENCE TO RELATED APPLICATION

This application claims the benefit of Chinese Patent Application No. 201610858781.7, filed on Sep. 28, 2016, which are incorporated herein by reference in its entirety.

BACKGROUND OF THE DISCLOSURE

Field of the Disclosure

The present disclosure relates to the field of power electronics, and more particularly, to an LED drive circuit.

Background of the Disclosure

In order to minimize LED drive circuits, LED loads are usually integrated together with a low dropout (LDO) linear voltage regulator to directly receive a rectified half-wave signal for driving the LED loads.

FIG. 1 is a circuit diagram of an LED drive circuit according to the prior art. As shown in FIG. 1, a plurality of LED loads D1 to D4 are coupled in series between a high-voltage terminal and low-voltage terminal (i.e., the ground terminal in FIG. 1) of an input port. A plurality of transistors S1 to S4 are respectively coupled to a cathode of a corresponding LED load and the ground, and an input voltage is a rectified half-wave signal. When the input voltage is low, the transistor S1 operates in a linear state such that the LED loads D2 to D4 are short-circuited, and meanwhile the transistor S1 can regulate the current flowing through the LED loads in accordance with actual requirements. When the input voltage rises, the transistor S2 operates in the linear state such that the LED loads D3 to D4 are short-circuited and the transistor S2 can regulate the current flowing through the series circuit consisting of the LED loads D1 to D2, and so on. FIG. 2 is an operating waveform diagram showing variation of the input voltage and operating states of the transistors. In the technical scheme shown by FIG. 1, during each operating cycle, the LED load D1 has the longest operating time, and the LED load D4 closest to the ground has the shortest operating time. On one aspect, uneven use of LED loads will reduce the lifetime of the whole circuit, on the other aspect, the absolute usage time of the LED loads is shortened, resulting in low utilization of the LED loads.

SUMMARY OF THE DISCLOSURE

In view of this, there is provided an LED drive circuit, in which the usage time of the plurality of LED loads is averaged so that the lifetime of the whole circuit is increased.

According to a first aspect, there is provided an LED drive circuit, comprising: N+1 LED loads and N isolation elements being coupled between a high-voltage terminal and a low-voltage terminal of an input port, wherein each of the isolation elements is coupled between two adjacent LED loads;

N first transistors and N second transistors, wherein the first transistors and the second transistors are controlled to operate in a linear state, in a conductive state, or in an off state to control the N+1 LED loads to be in parallel connection or series connection; and a third transistor which is controlled to operate in the linear state in order to regulate current flowing through the N+1 LED loads when the first transistors and the second transistors are both in the off state, wherein N is not less than 1.

Preferably, the third transistor is controlled to be in the conductive state while the first transistors and the second transistors operate in the linear state.

Preferably, the first transistors and the second transistors are controlled to operate in the linear state such that the current flowing through each of the LED loads is equal.

Preferably, when an input voltage is greater than a first threshold value but less than a second threshold value, the first transistors and the second transistors are controlled to operate in the linear state or in the conductive state and the third transistor is controlled to be in the conductive state; when the input voltage is greater than the second threshold value, the first transistors and the second transistors are switched to the off state and the third transistor is switched to the linear state.

Preferably, the isolation elements are capacitors;

when the input voltage drops to be less than the second threshold value, the first transistors, the second transistors and the third transistor are all controlled to operate in the linear state, and the current flowing through the first transistors and the second transistors is regulated such that the polarity of voltages across said capacitors are gradually reversed and increased to a predetermined value.

Preferably, the capacitance values of the capacitors are determined in accordance with operating current when the LED loads are in series connection and desired duration time of series connection in each operating cycle.

Preferably, the isolation elements are capacitors or resistors.

Preferably, each of the first transistors is coupled between a first terminal of a corresponding isolation element and the low-voltage terminal, each of the second transistors is coupled between the high-voltage terminal and a second terminal of a corresponding isolation element, the third transistor is coupled in series with one of the LED loads.

Preferably, each of the first transistors is coupled between a first terminal of a corresponding isolation element and an intermediate node, each of the second transistors is coupled between the high-voltage terminal and a second terminal of a corresponding isolation element, the N+1 LED loads and the N isolation elements are coupled between the high-voltage terminal and the intermediate node, the third transistor is coupled between the intermediate node and the low-voltage terminal.

Preferably, each of the first transistors is coupled between a first terminal of a corresponding isolation element and the low-voltage terminal, each of the second transistors is coupled between an intermediate node and a second terminal of a corresponding isolation element, the N+1 LED loads and the N isolation elements are coupled between the intermediate node and the low-voltage terminal, the third transistor is coupled between the high-voltage terminal and the intermediate node.

According to a second aspect, there is provided an LED drive circuit, comprising:

N+1 LED drive modules and N module isolation elements being coupled between a high-voltage terminal and a low-voltage terminal of an input port, wherein each of the N module isolation elements is coupled between adjacent LED loads, N is not less than 1, each of the LED drive module comprises M+1 LED loads, the connection of which can be switched between parallel connection and series connection, M is greater than or equal to 1;

N first transistors and N second transistors, wherein the first transistors and the second transistors are controlled to operate in a linear state, in a conductive state or in an off state to control the N+1 LED drive modules to be in parallel connection or series connection; and a third transistor which is controlled to operate in the linear state in order to regulate current flowing through the series LED loads when the first transistors and the second transistors are both in the off state and the LED loads of the LED drive modules are in series connection.

Preferably, each of the LED drive modules comprises M fourth transistors and M fifth transistors, the M fourth transistors and the M fifth transistors are controlled to operate in the linear state, the conductive state or in the off state to control the M LED loads to be in parallel connection or in series connection.

Preferably, the third transistor is controlled to operate in the conductive state when the first transistors and the second transistors operate in the linear state, and/or, the fourth transistors and the fifth transistors operate in the linear state.

Preferably, the first transistors and the second transistors are controlled to operate in the linear state such that the current flowing through each of the LED drive modules is equal.

Preferably, when an input voltage is greater than a first threshold value but less than a second threshold value, the first transistors and the second transistors are in the conductive state, the fourth transistors and the fifth transistors are controlled to operate in the linear state or the conductive state, the third transistor is controlled to be in the conductive state;

when the input voltage is greater than the second threshold value but less than the third threshold value, the fourth transistors and the fifth transistors are controlled to operate in the off state, the first transistors and the second transistors are all controlled to operate in the linear state, the third transistors are controlled to operate in the conductive state;

when the input voltage is greater than the third threshold value, the first transistors, the second transistors, the fourth transistors and the fifth transistors are all switched to the off state and the third transistor is controlled to operate in the linear state.

Preferably, the module isolation elements are capacitors, when the input voltage is greater than the third threshold value, the fourth transistors, the fifth transistors and the third transistor are all controlled to operate in the linear state, the current through the fourth transistors and the fifth transistors is regulated such that voltages across the capacitors are gradually reversed and rise to a determined value.

Preferably, the capacitance values of the capacitors are determined in accordance with operating current when the LED drive modules are in series connection and desired duration time of series connection in each operating cycle.

Preferably, the module isolation elements are capacitors or resistors.

Preferably, the LED drive module further comprises:

M load isolation elements being coupled at the input port of the LED drive module together with the M+1 LED loads, wherein each of the M load isolation elements is respectively coupled between two adjacent LED loads, each of the fourth transistors is coupled between a first terminal of a corresponding load isolation element and a low-voltage terminal of the input port of the LED drive module, each of the second transistors is coupled between a high-voltage terminal of the input port of the LED drive module and a second terminal of a corresponding load isolation element.

Preferably, the load isolation elements are capacitors or resistors.

Preferably, the third transistor is coupled in series to one of the LED loads in any of the LED drive modules, or, the third transistor is coupled between the low-voltage terminal of the input port of the LED drive circuit and the low-voltage terminal of the input port of the LED drive module adjacent to the low-voltage terminal of the input port of the LED drive circuit; or the third transistor is coupled between the high-voltage terminal of the input port of the LED drive circuit and the high-voltage terminal of the input port of the LED drive module adjacent to the high-voltage terminal of the input port of the LED drive circuit.

The plurality of LED loads are configured to switch between the parallel connection and series connection. When the input voltage is low, the LED loads are controlled to be connected in parallel, and the transistors provided on the corresponding parallel branch circuits are controlled to operate in the linear state to regulate the current flowing through the LED loads. When the input voltage increases, the LED loads are controlled to be connected in series, and the transistors provided on the corresponding series branch circuits are controlled to regulate the current flowing through all the LED loads. Accordingly, on one hand, all the LED loads are controlled to have a same operating time, on the other hand, all the LED loads are controlled to operate during most time of the entire operating cycle. Thus, the lifetime of the circuit and the utilization of the LED loads are improved.

Further, by referring to the LED driver circuit, a plurality of drive modules can be switched between parallel connection and series connection in similar structure, so that the drive modules can be applicable for driving a large number of LED loads.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF THE DISCLOSURE

Reference will now be made in detail to particular embodiments of the disclosure, it will be understood that the scope of the present invention is not limited to these embodiments. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, processes, components, and circuits have not been described in detail so as not to unnecessarily obscure aspects of the present invention.

Furthermore, it will be understood by one skilled in the art that attached drawings are to be regarded as illustrative, and may not be drawn to scale.

Also, it will be understood in the following description that the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection of two components can be physical or logical connection, or physical and logical connection. On the contrary, when one component is referred to as being "coupled directly to" or "connected directly to" another component, there will be no an intermediate component between two components.

On the contrary, when one component is referred to as being "coupled directly to" or "connected directly to" another component, there will be no an intermediate component between two components.

In the following description that the terms such as "first", "second" and the like are used herein for purposes of description and are not intended to indicate or imply relative importance or significance. The term "plurality", as used herein, is defined as two or more than two, unless something otherwise is specifically stated.

Figure 1:
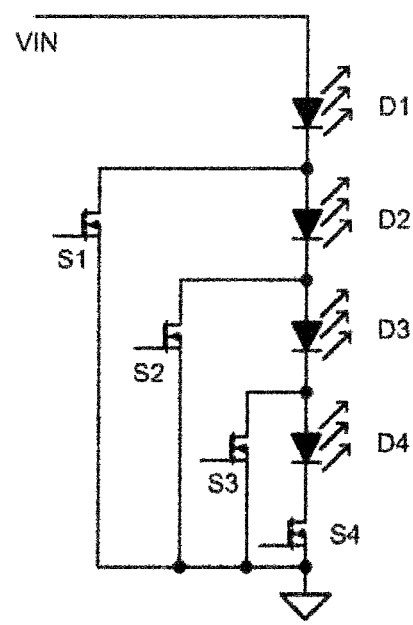
FIG. 1 is a circuit diagram of an LED drive circuit according to the prior art.
Figure 2:
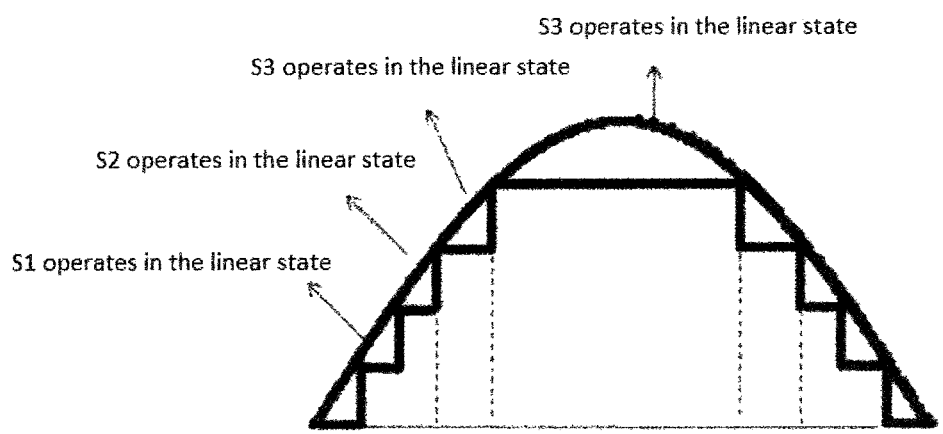
FIG. 2 is an operating waveform diagram showing an input voltage and voltages of the transistors of the LED drive circuit in FIG. 1.
Figure 3:
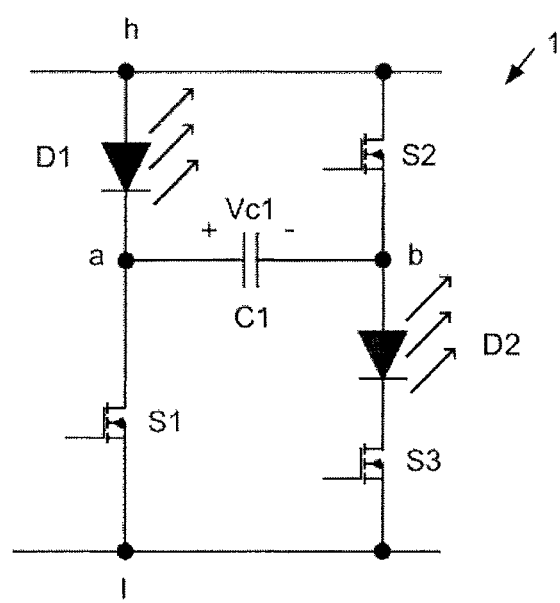
FIG. 3 is a schematic circuit diagram of an LED drive circuit according to a first embodiment of the present disclosure.

FIG. 3 is a schematic circuit diagram of an LED drive circuit according to a first embodiment of the present disclosure. As shown in FIG. 3, the LED drive circuit 1 includes two LED loads D1 and D2, a capacitor C1 and transistors S1 to S3. The LED load D1, the capacitor C1 and the LED load D2 are sequentially coupled between an high-voltage terminal h and a low-voltage terminal 1 of an input port of the LED drive circuit, that is, the capacitor C1 is coupled between the cathode of the LED load D1 and the anode of the LED load D2. The transistor S1 is coupled between a first terminal a of the capacitor C1 and the low-voltage terminal 1. The function of the transistor S1 is to short-circuit the corresponding components between the capacitor C1 and the low-voltage terminal 1 (i.e., the capacitor C1 and the LED load D2 in FIG. 3) when the transistor is turned on. According to the embodiment, the transistor having such a function and a connection (being coupled between the high-voltage terminal of the capacitor as an isolation element and the low-voltage terminal of the input port) is also referred to as a first transistor. The transistor S2 is coupled between a second terminal b of the capacitor C2 and the high-voltage terminal h. The function of the transistor S2 is to short-circuit all the corresponding components between the capacitor C1 and the high-voltage terminal, (i.e., the capacitor C1 and the LED load D1 in FIG. 3) when the transistor S2 is turned on. According to the embodiment, the transistor having such a function and a connection (being coupled between the low-voltage terminal of the capacitor as an isolation element and the high-voltage terminal of the input port) is also referred to as a second transistor. When the transistors S1 and S2 are controlled to be turned on at the same time, the current flowing through the input port can either flow to the low-voltage terminal 1 along the branch circuit consisting of the LED load D1 and the transistor S1, or flow to the low-voltage terminal 1 along the branch circuit consisting of the LED load D2 and the transistor S2, and the LED loads D1 and D2 are thus in parallel connection. When the transistors S1 and S2 are controlled to be turned off at the same time, the voltage between the two terminals a and b of the capacitor C1 is zero or less than 0, after the connection manner is changed, the current flowing through the input port flows along the loop consisting of the LED load D1, the capacitor C1 and the LED load D2, so that the LED loads D1 and D2 are thus in series connection. That means, the two LED loads D1 and D2 are controlled to switch between parallel connection and series connection by controlling the transistors S1 and S2 to be turned on and off.

Meanwhile, the transistors S1 and S2 are controlled to be turned on and operate in a linear state, so that the current flowing through the transistors S1 and S2 can be regulated, and the current flowing through the parallel branch circuits respectively including the LED load D1 and the LED load D2 can be regulated. It should be understood that in the embodiment, there are two different states for turned-on transistors, that is, a turned-on transistor can operate in the linear state or in the conductive state. In the linear state, the transistor can control the current flowing through it, and in the conductive state, the transistors can be considered as being short-circuited between its two electrodes.

It should be understood that in the disclosure, each of the transistors can operate in an off state, the conductive state and the linear state. If one transistor operates in the off state, its impendence becomes extremely high such that the current flowing through it is almost zero. If one transistor operates in the conductive state, its impendence becomes extremely low such that the voltage drops across itis almost zero. If one transistor operates in the linear state, it can control the current flowing through it according to the voltage at its control terminal (for example, a gate of a MOS transistor).

The transistor S3 is provided on the series circuit consisting of the LED load and the capacitor. Specifically, in FIG. 3, the transistor S3 and the LED load D2 are coupled in series between the second terminal b of the capacitor C1 and the low-voltage terminal. When the transistors S1 and S2 are turned on, the transistor S3 is in the conductive state, so that the current through the transistors S1 and S2 will not be affected. When the transistors S1 and S2 are turned off, the transistor S3 operates in the linear state, and regulates the current flowing through the LED loads D1 and D2 connected in series. It is easily understood that the transistor S3 can also be provided on other locations of the series circuit, for example, the transistor S3 can be coupled in series to the LED load D1 between the high-voltage terminal and the first terminal a of the capacitor C1.

Figure 4:
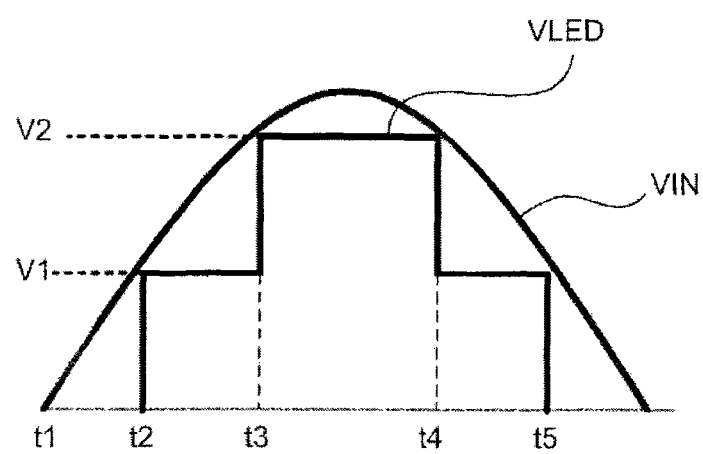
FIG. 4 is an operating waveform diagram showing an input voltage of the LED drive circuit and voltages of the transistors of the LED drive circuit in FIG. 3.

FIG. 4 is an operating waveform diagram showing an input voltage of the LED drive circuit and voltages of the transistors. As shown in FIG. 4, the LED drive circuit according to the embodiment can directly be coupled to an output terminal of a rectifier circuit, for receiving a sinusoidal half-wave DC voltage VIN from the rectifier circuit. Generally, in each operating cycle, the input voltage VIN rises from zero to a maximum value, then drops from the maximum value to zero. During the time period from t1 to t2, the input voltage is less than a first threshold value V1, which cannot turn on any of the LED loads. During this time period, all the LED loads don't operate and the transistors S1 to S3 can operate in any state. Preferably, during the time period, the transistors S1 to S3 are turned off. During the time period from t2 to t3, the input voltage rises from the first threshold value V1 to a second threshold value V2, which can drive an LED load to be turned on. During this time period, the transistors S1 and S2 are controlled to operate in the linear state, the transistor S3 are controlled to operate in the conductive state, as a result, the LED loads D1 and D2 are in parallel connection, the current flowing through the two parallel branch circuits can be regulated by the transistors S1 and S2, respectively. Thus, the control of the LED loads is implemented. Preferably, the transistors S1 and S2 are controlled to operate in the linear state for controlling the current flowing through the different LED loads to be approximately equal. During the time period from t3 to t4, the input voltage rises from the second threshold value V2 to the maximum value and then gradually drops to the second threshold value V2, which is sufficient to drive the two series LED loads to be turned on. During this time period, the transistors S1 and S2 are turned off, so that the LED loads D1 and D2 are in series connection, and the current flowing through the series circuit is controlled by the transistor S3 which operates in the linear state. When the input voltage drops to be less than the second threshold value V2, according to similar methods, the circuit can be controlled to be in parallel connection and the current flowing through the parallel circuits can be regulated. When the input voltage drops to be less than the first threshold value V1, the LED loads D1 and D2 stop operating. The process is repeated as above. Accordingly, during the time period from t2 to t5 in each operating cycle, all the LED loads operates, and the various LED loads have a same operating time.

When the circuit switches from series connection to parallel connection, that is, the transistors S1 and S2 switch from the off state to the linear state, the voltage across the two terminals a and b of the capacitor switches from a positive value (i.e., the electric potential of the first terminal a is higher than the electric potential of the second terminal b) to a negative value. In order to prevent excessive current from damaging the circuit, the transistors S1,S2 and S3 are required to operate in the linear state during the switching process to make the current $I_{S1}$ flowing through the transistor S1 and the current $I_{S2}$ through the transistor S2 both equal to the sum value of the current $I_{D1}$ flowing through the LED load D1 and the current $I_{C1}$ flowing through the capacitor, wherein the LED load D1 is not coupled to the transistor S3 in series.

That is $I_{S1}=I_{S2}=I_{D1}+I_{C1}$.

Accordingly, the voltage across the capacitor is gradually reversed and rises to a predetermined value, and thus, it would not happen that the circuit operates abnormally due to excessive large current or small current during a short time period.

Moreover, when operated in series connection mode, the voltage across the capacitor C1 gradually rises, after the voltage rises to some extent, the LED loads cannot operate. In order to make the operation time of the LED loads in series connection mode to be long enough, the voltage across the capacitor C1 needs to be controlled to satisfy the following equation, $$V_{C1} = \frac{I_{S3} * T}{C1},$$

where T is turn-on time in series connection, $I_{S3}$ is the current flowing through the transistor S3, C1 is the capacitance value, and $V_{C1}$ is the voltage across the capacitor. The largest capacitance value of capacitor C1 is determined to make the LED load to be normally operated during the time interval of series connection mode that is the LED loads are in series connection. Thus, the capacitance value of the capacitor C1 can be determined according to the desired operating time T and the current flowing through the transistor S3. That is, the capacitance value of the capacitor is determined in accordance with the operating current when the LED loads are coupled in series and the desired duration time of series connection in each operating cycle.

Figure 5:
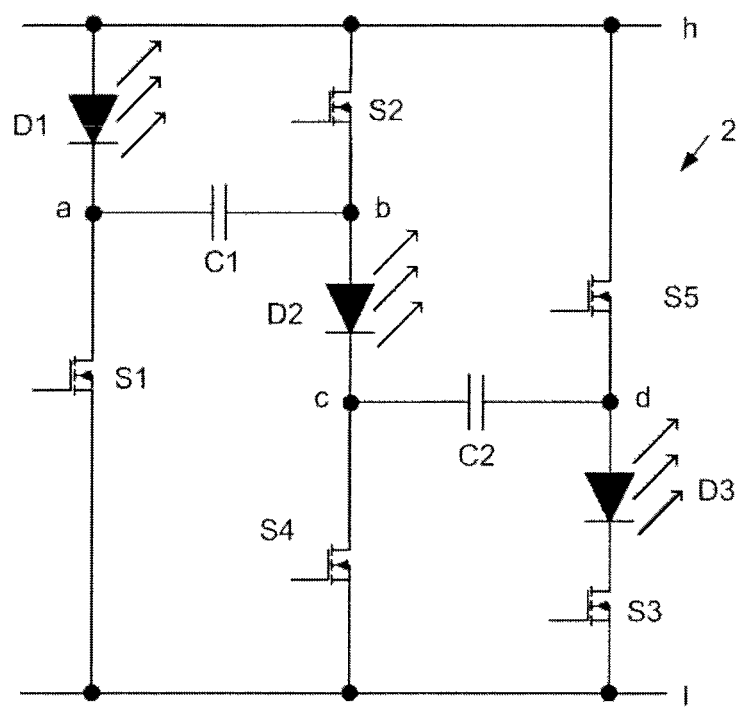
FIG. 5 is a schematic circuit diagram of an LED drive circuit according to a second embodiment of the present disclosure.

Meanwhile, the LED drive circuit according to the embodiment is not limited to two parallel branch circuits, more parallel branch circuits by providing more LED loads are also applicable. FIG. 5 is a schematic circuit diagram of an LED drive circuit according to a second embodiment of the present disclosure. As shown in FIG. 5, the LED drive circuit 2 includes three LED loads D1, D2 and D3, the capacitors C1 and C2, the transistors S1 to S5. The LED loads and the capacitor are coupled between the high-voltage terminal h and the low-voltage terminal 1 of the input port, in the order of the LED load D1, the capacitor C1, the LED load D2, the capacitor C2, and the LED load D3. The transistors S1 and S2 correspond to the capacitor C1. The transistor S1 is coupled between the first terminal a of the capacitor C1 and the low-voltage terminal 1. The transistor S2 is coupled between the second terminal b of the capacitor C1 and the high-voltage terminal h. The transistors S4 and S5 correspond to the capacitor C2. The transistor S4 is coupled between a first terminal c of the capacitor C2 and the low-voltage terminal 1. The transistor S5 is coupled between a second terminal d of the capacitor C2 and the high-voltage terminal h. As a result, when current is allowed to flow through the transistors S1,S2, S4 and S5, the three LED loads D1,D2 and D3 are in parallel connection. The LED load D1 and the transistor S1 constitute a parallel branch circuit, the LED load D2 and the transistors S2 and S4 constitute a parallel branch circuit, and the LED load D3 and the transistor S5 constitute a parallel branch circuit. In such case, the current flowing through the three branch circuits can be regulated respectively, by controlling the transistor S1 to operate in the linear state, the transistor S2 and/or S4 to operate in the linear state and the transistor S5 to operate in the linear state. That is, in such case, one part of the transistors S1, S2, S4 and S5 are controlled to operate in the linear state (for example, S1,S2 and S5) and the other part (for example, S4) is in the linear state or in the conductive state, so that, the adjustment of the parallel branch circuits is realized. Generally, one of the two transistors provided on a same branch circuit is in the conductive state, the other one is in the linear state. When the transistors S1, S2, S4 and S5 are turned off, the LED loads D1, D2 and D3, and the capacitors C1 and C2 constitute a series circuit. The initial voltage across the capacitor is equal to zero and the voltage of the second terminal of the capacitor is greater than that of the first terminal of the capacitor in parallel connection. Thus, after switching to series connection, the capacitor is charged reversely, so that the current flows through the capacitor to turn on the entire series circuit. In other words, the transistors S1, S2, S4 and S5 are controlled to switch between different states so that the LED loads are switched between parallel connection and series connection. In parallel connection, the transistor S3 controls the current through the parallel branch circuits (i.e., current flowing through LED loads) by controlling their corresponding transistors to operate in the linear state.

The transistor S3 is provided on the series circuit consisting of the LED loads and the capacitor. Specifically, in FIG. 5, the transistor S3 and the LED load D3 are coupled in series between the second terminal d of the capacitor C2 and the low-voltage terminal. When the transistors S1, S2, S4 and S5 are turned on, the transistor S3 is in the conductive state, so that the current through the transistor S3 won't be affected. When the transistors S1, S2, S4 and S5 are turned off, the transistor S3 operates in the linear state, and regulates the current flowing through the three series LED loads D1, D2 and D3. It is easily understood that the transistor S3 can also be provided on other locations of the series circuit, for example, the transistor S3 may be coupled in series to the LED load D1 between the high-voltage terminal and the first terminal a of the capacitor C1.

Similarly, the LED drive circuit shown in FIG. 3 and FIG. 5 can be expanded to have any number of LED loads.

Meanwhile, in the LED drive circuits shown in FIG. 3 and FIG. 4, the capacitors can be replaced by resistors. The use of the resistors can speed up the switching speed, the various transistors in the LED loads can directly switch from series connection to parallel connection, without operating simultaneously in the linear state to wait for the voltage across the capacitor to reach a predetermined value. However, the capacitors are storage elements, their power consumption is relatively low, after the replacement, the entire power consumption of the LED drive circuit is increased.

Figure 6:
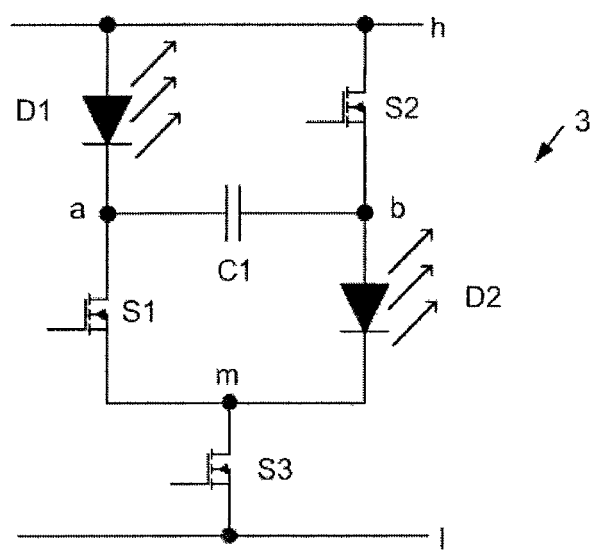
FIG. 6 is a schematic circuit diagram of an LED drive circuit according to a third embodiment of the present disclosure.

Meanwhile, as an alternative manner, the transistor provided on the series circuit can also have another configuration. FIG. 6 is a schematic circuit diagram of an LED drive circuit according to a third embodiment of the present disclosure. An LED drive circuit 3 shown in FIG. 6 provides two LED loads D1 and D2, and further includes the transistors S1, S2 and S3, and the capacitor C1 as an isolation element. The LED load D1, the capacitor C1 and the LED load D2 are coupled sequentially between the high-voltage terminal and an intermediate node m. The transistor S1 is coupled between the first terminal a of the capacitor C1 and the intermediate node m. The transistor S2 is coupled between the second terminal b of the capacitor C1 and the high-voltage terminal h. The transistor S3 is coupled between the intermediate node m and the low-voltage terminal 1. That is, the transistor S1 and the LED load D1 can be referred to as one parallel branch circuit, the transistor S2 and the LED load D2 can be referred to as another parallel branch circuit, the transistor S3 is coupled in series to the parallel circuit consisting of the two branch circuits. When the transistors S1 and S2 are controlled to operate in the linear state, the transistor S3 is controlled to operate in the conductive state, so that, the transistors S1 and S2 control the current flowing through the corresponding parallel branch circuits, respectively. When the transistors S1 and S2 are controlled to be turned off, the transistor S3 is controlled to operate in the linear state, at the time, the LED loads D1 and D2 are in series connection, the transistor S3 controls the current flowing the series circuit.

Further, the LED drive circuit shown in FIG. 6 is not limited to two LED loads, and can be expanded to have any number of LED loads.

Figure 7:
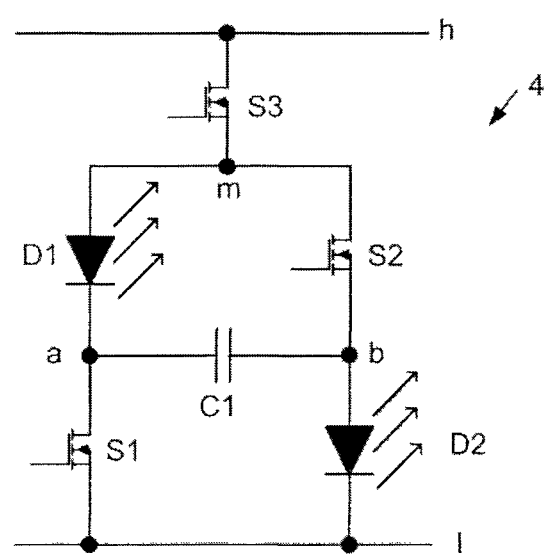
FIG. 7 is a schematic circuit diagram of an LED drive circuit according to a fourth embodiment of the present disclosure.

Meanwhile, the location of the transistor S3 is not limited to the side of the low-voltage terminal, it can also be set at the side of the high-voltage terminal, that is, as shown in FIG. 7, in the LED drive circuit 4, the LED loads are coupled to the capacitor between the intermediate node m and the low-voltage terminal 1, one terminal of the transistor S2 is coupled to the second terminal b (close to the low-voltage terminal) of the capacitor C1, the other terminal of the transistor S2 is coupled to the intermediate node m. The transistor S3 is coupled between the intermediate node m and the high-voltage terminal h. This structure can also implement the same function as the circuit in FIG. 6 in accordance in the same control manner.

Figure 8:
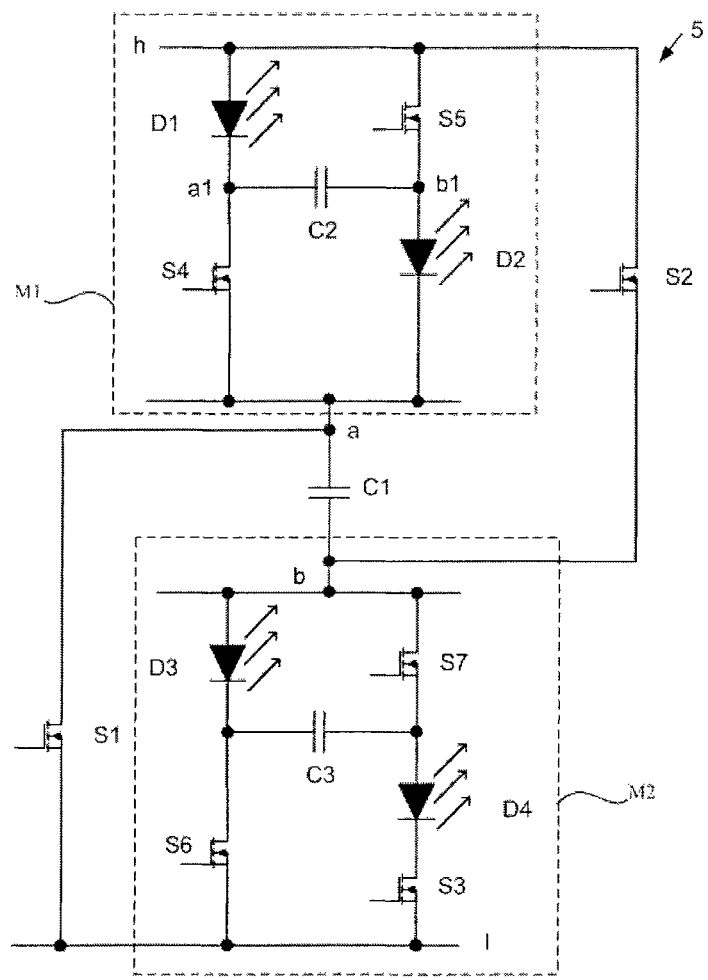
FIG. 8 is a schematic circuit diagram of an LED drive circuit according to a fifth embodiment of the present disclosure.

Meanwhile, the LED loads in FIGS. 3, 5, 6, and 7 can be replaced by LED drive modules, to achieve multi-level control. FIG. 8 is a schematic circuit diagram of an LED drive circuit according to a fifth embodiment of the present disclosure. As shown in FIG. 8, an LED drive circuit 5 includes two LED drive modules M1 and M2, the capacitor C1 and the transistors S1 to S3. The LED drive modules M1 and M2 each include an input port, and the input port has a high-voltage terminal and a low-voltage terminal. The LED drive module M1, the capacitor C1 and LED drive module M2 are coupled sequentially between the high-voltage terminal h and the low-voltage terminal 1 of the input port. The transistor S1 is coupled between a first terminal a of the capacitor C1 and the low-voltage terminal 1. The transistor S2 is coupled between the second terminal b of the capacitor C1 and the high-voltage terminal h. The transistor S3 is coupled to the LED drive module M2 in series between the second terminal b of the capacitor C1 and the low-voltage terminal, that is, the transistor S3 is provided on the series circuit consisting of the LED drive module M1, the capacitor C1 and the LED drive module M2. When the transistor S1 is turned on, the capacitor C1 and the LED module M2 are short-circuited. When the transistor S2 is turned on, the capacitor C1 and the LED drive module M1 are short-circuited, so that the LED drive modules M1 and M2 are in parallel connection. At the time, the transistor S3 is controlled to be turned on, the transistors S1 and S2 are controlled to operate in the linear state for controlling the current flowing through the different parallel branch circuits, i.e., the current flowing through the different drive modules. Preferably, the transistors S1 and S2 are controlled to operate in the linear state for controlling the current flowing through the different LED drive modules to be approximately equal. When the transistors S1 and S2 are turned off, the LED drive modules M1 and M2, and the capacitor C1 constitute a series circuit, and the current flowing through the series circuit is controlled by controlling the transistor S3 to operate in the linear state.

Meanwhile, in the embodiment, the LED drive modules M1 and M2 include a plurality of LED loads, the LED loads can switch between series connection and parallel connection, that is, the LED drive modules can form a composite load consisting of all the LED loads in parallel, or form a composite load consisting of all the LED loads in series. Preferably, the LED drive modules M1 and M2 use the structure as shown in FIG. 6. That is, the LED drive module M1 includes two LED loads D1 and D2, the capacitor C2 as an isolation element, and the transistors S4 and S5. The LED load D1 is coupled between the high-voltage terminal of the input port of the drive module and a first terminal a1 of the capacitor C2, the LED load D2 is coupled between a second terminal b1 of the capacitor C2 and the low-voltage terminal of the input port of the drive module. The transistor S4 is coupled between the low-voltage terminal of the input port of the drive module and the first terminal a1 of the capacitor C2, the transistor S5 is coupled between the high-voltage terminal of the input port of the drive module and the second terminal b1 of the capacitor C2. The LED drive module M2 has a similar structure. The transistor S3 can be provided inside the LED drive module M2. In FIG. 8, the transistor S3 is coupled in series to one LED load close to the low-voltage terminal 1 in the LED drive module M2. It is easily understood that the transistor S3 can be coupled in series to the other LED load in the LED drive module M2, or coupled in series to any of the LED loads in the LED drive module M1, to achieve the purpose of coupling the transistor to the series circuit consisting of the LED loads.

The LED loads in the LED drive module can switch between parallel connection and series connection, so that the LED drive circuit 5 can realize multi-level control. That is, the LED loads D1 to D4 in the LED drive circuit 5 have three following connection manners.

In a first connection manner, the LED loads in the LED drive module are in parallel connection, the LED drive modules are also in parallel connection. At the condition, only a voltage for driving one LED load to operate is required for lighting all the LED loads.

In a second connection manner, the LED loads in the LED drive module are switched to be in series connection and the LED drive modules are in parallel connection. At the condition, a voltage for driving two LED loads to operate is required to light all the LED loads, that is, the input voltage is required to be larger.

In a third connection manner, the LED loads in the LED drive module are in series connection, the LED drive modules are switched to be in series connection. At the condition, all the LED loads D1 to D4 and the three capacitors C1 to C3 constitute a series circuit.

Figure 9:
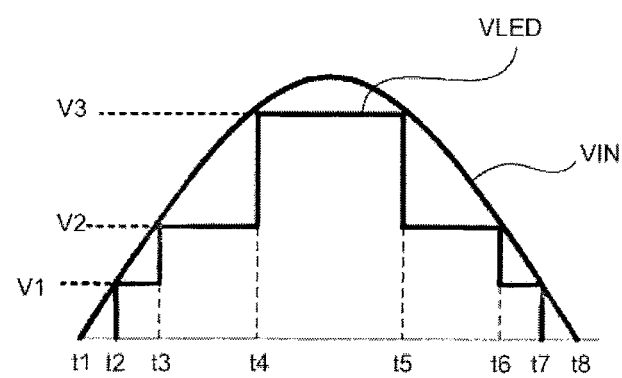
FIG. 9 is an operating waveform diagram showing an input voltage and voltages of the transistors of the LED drive circuit in FIG. 8.

For the three different connection manner, the LED drive circuit 5 can be controlled to operate by using three-level threshold values. FIG. 9 is a timing diagram showing the relationship of the input voltage of the LED drive circuit and the voltages of the transistors of the LED drive circuit in FIG. 8. As shown in FIG. 9, during the time period t1 to t2, the input voltage rises from zero to the first threshold value V1. During this time period, the input voltage cannot drive any of the LED loads to be turned on, all the LED loads cannot operate, the transistors S1 to S7 can be in any state. During the time period from t2 to t3, the input voltage rises from the first threshold value V1 to the second threshold value V2, which can drive one LED load to be turned on. During this time period, the transistors S4 and S7 are controlled to operate in the linear state for controlling the current flowing through the various LED loads. The transistors S1 to S3 are controlled to operate in the conductive state. During this time period, all the LED loads are in parallel connection. The transistors S4 to S7 can regulate the current flowing through the four LED loads, respectively. During the time period t3 to t4, the input voltage rises from the second threshold value V2 to the third threshold value V3, which can drive two LED loads in series to be turned on, during this time period, the transistors S4 to S7 are turned off so that the LED loads D1 and D2 in the LED drive module M1 are coupled in series, and the LED loads D3 and D4 in the LED drive module M2 are coupled in series. The transistors S1 and S2 are controlled to operate in the linear state, so that the series circuit consisting of D1 and D2 and the series circuit consisting of D3 and D4 are couple in parallel. The transistors to S3 are controlled to operate in the conductive state. The transistor S1 adjusts the current flowing through the LED drive module M1, the transistor S2 adjusts the current flowing through the LED drive module M2. During the time period t4 to t5, the input voltage rises from the third threshold value V3 to a maximum value, then drops to the third threshold value V3, which can drive four series LED loads to be turned on, during the time period, the transistors S1 to S2, S4 to S7 are turned off, so that the LED loads D1 to D4 are coupled in series. The transistor S3 is controlled to operate in the linear state for adjusting the current flowing through the series circuit. During the time period t5 to t6, the input voltage drops from the third threshold value V3 to the second threshold value V2, the control manner during the time period is same with that during the time period t3 to t4. The transistors S1 to S2 are controlled to operate in the linear state, the transistors S4 to S7 are controlled to be turned off, so that the series circuit consisting of D1 and D2 and the series circuit consisting of D3 and D4 are coupled in parallel. During the time period t6 to t7, the input voltage drops from the second threshold value V2 to the first threshold value V1, the control manner during the time period is same with that during the time period t2 to t3. The transistors S4 to S7 are controlled to operate in the linear state, the transistors S1 to S3 are controlled to be in the conductive state, so that the LED loads D1 to D4 are coupled in parallel. During the time period t7 to t8, the input voltage drops to be less than the first threshold value V1, the LED loads D1 and D2 stop operating. The process is repeated as above. Accordingly, during the time period t2 to t7 in each operating cycle, all the LED loads operate, and different LED loads have a same operating time.

The circuit according to the embodiment can enable the LED drive circuit to drive more number of LED loads.

Similarly, when the LED drive modules switch from series connection to parallel connection, the voltage across the two terminals a and b of the capacitor C1 is positive, after switching, the voltage switches to be negative. In order to prevent excessive current from damaging the circuit, during the switching process, it is required that the transistors S1 to S3 operate in the linear state and the current flowing through the transistors S1 and S2 satisfy a predetermined relationship, so that the voltage across the capacitor can be gradually reversed and rise to a predetermined value. Thus, it won't happen that the circuit operates abnormally due to excessive large current or small current.

Figure 10:
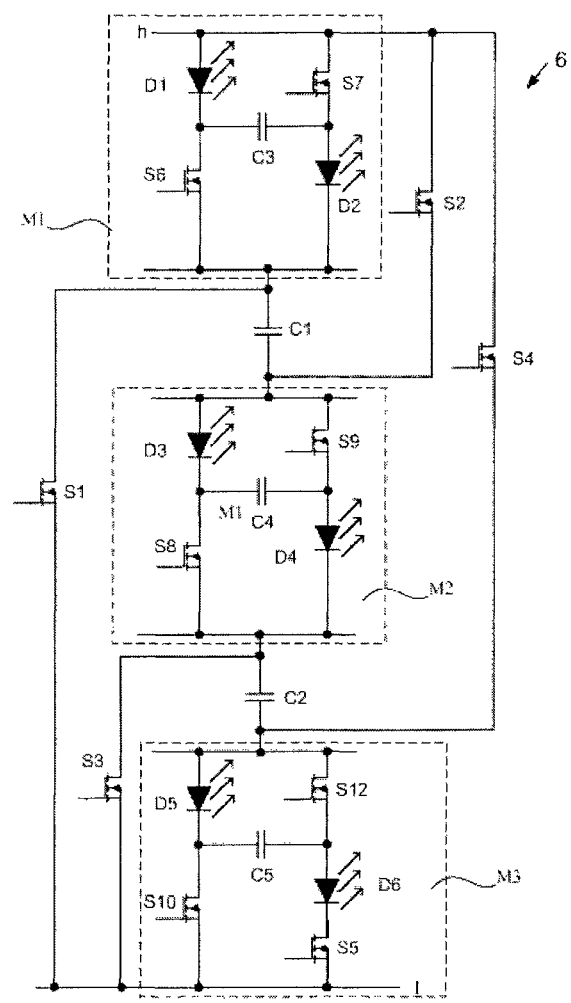
FIG. 10 is a schematic circuit diagram of an LED drive circuit according to a sixth embodiment of the present disclosure.

Meanwhile, the LED drive circuit according to the embodiment is not limited to set two parallel branch circuits, it is possible to set more LED loads to obtain more parallel branch circuits. FIG. 10 is a schematic circuit diagram of an LED drive circuit according to a sixth embodiment of the present disclosure. As shown in FIG. 10, a LED drive circuit 6 includes three LED drive modules M1 to M3, the capacitors C1 and C2, and the transistors S1 to S11. The LED drive module M1, the capacitor C1, the LED drive module M2, the capacitor C2, and the LED drive module M3 are coupled sequentially between the high-voltage terminal h and the low-voltage terminal 1 of the input port of the drive circuit. The transistors S1 to S4 are used for changing the connection of the LED drive modules M1 to M3. The transistor S5 is provided in all of the series circuits which can be possibly formed by the LED loads. Each of the LED drive modules has the same structure as shown in FIG. 9. Accordingly, the transistors S1 to S4 control the connection relationship of the LED drive modules M1 to M3, the transistors S6 to S11 control the connection relationship of the LED loads in the LED drive modules M1 to M3, respectively, so that the connection between the six LED loads in the LED drive circuit is driven to switch in the three states including all parallel connection, series connection in each module and parallel connection between modules, and all series connection. Under the state of all parallel connection, the corresponding transistors in the modules controls the current flowing through the LED loads. Under the state of series connection in each module and parallel connection between modules, the transistors corresponding to the modules control the current flowing through the LED loads. Under the state of all series connection, the transistor S5 being provided in the series circuit controls the current flowing through the LED loads. Thus, the drive circuit drives more LED loads while ensuring the length and evenness of the usage time of the LED loads.

Figure 11:
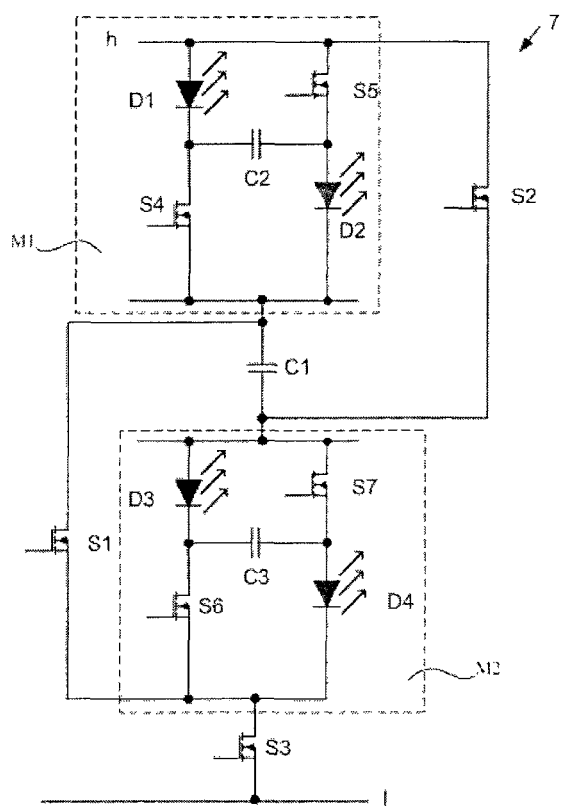
FIG. 11 is a schematic circuit diagram of an LED drive circuit according to a seventh embodiment of the present disclosure.

Meanwhile, The transistor S5 provided in the series circuit may also be provided outside the LED drive module as shown in FIG. 11. As shown in FIG. 11, an LED drive circuit 7 includes two LED drive modules M1 and M2, the transistors S1, S2 and S3, and the capacitor C1 as an isolation element. The LED drive module M1, the capacitor C1 and the LED drive module M2 are coupled sequentially between the high-voltage terminal and the intermediate node m. The transistor S1 is coupled between the first terminal a of the capacitor C1 and the intermediate node m. The transistor S2 is coupled between the second terminal b of the capacitor C1 and the high-voltage terminal h. The transistor S3 is coupled between the intermediate node m and the low-voltage terminal 1. That is, the transistor S1 and the LED drive module M1 can be referred to as one parallel branch circuit, the transistor S2 and the LED drive module M2 can be referred to as another parallel branch circuit, the transistor S3 is coupled in series to the parallel circuit consisting of the above branch circuits. When the transistors S1 and S2 are controlled to operate in the linear state, the transistor S3 is controlled to operate in the conductive state, so that, the transistors S1 and S2 control the current flowing through the corresponding parallel branch circuits, respectively. When the transistors S1 and S2 are controlled to be turned off, the transistor S3 is controlled to operate in the linear state, at the time, the LED loads D1 and D2 are in series connection, the transistor S3 controls the current flowing through the series circuit. The LED drive modules M1 and M2 have the same structure as shown in FIG. 10, which will not be further described here. Accordingly, the connection of the four LED loads in the LED drive circuits can be switched in the three states including all parallel connection, series connection in each module and parallel connection between modules and all series connection. Under the state of all parallel connection, the corresponding transistors in the modules control the current flowing through the LED loads. Under the state of series connection in each module and parallel connection between modules, the transistors corresponding to the modules control the current flowing through the LED loads. Under the state of all series connection, the transistor S5 being provided in the series circuits controls the current flowing through the LED loads. Thus, the drive circuit drives more LED loads while ensuring the length and evenness of the usage time of the LED loads.

It is easily understood that in FIG. 11, the number of the LED drive modules in LED drive circuit 7 is not limited to two, and the LED drive circuit 7 can be expanded to have any number of LED drive modules. The number of the LED loads in each LED drive module is not limited to two, and the LED drive module can be expanded to have three or more LED loads.

Meanwhile, in the LED drive circuit shown in FIGS. 8, 10 and 11, all or part of the isolation elements can be replaced by resistors. The use of resistors can speed up the switching speed, the various transistors can directly switch when the LED loads switch from series connection to parallel connection, without operating simultaneously in the linear state to wait for the voltage across the capacitor to reach a predetermined value. However, the capacitors are storage elements, their power consumption is relatively low, after the replacement, the whole power consumption of the LED drive circuit is increased. It is possible that only the isolation elements between the LED drive modules are replaced to resistors, or only the isolation elements in the LED drive modules are replaced to resistors, or all the isolation elements are replaced to resistors.

The disclosure provides the LED drive circuit, which is configured to switch the connection of a plurality of LED loads between parallel connection and series connection. When the input voltage is low, the LED loads are controlled to be in parallel connection, and the transistors provided on the corresponding parallel branch circuits are controlled to operate in the linear state for regulating the current flowing through the parallel branch circuits; when the input voltage rises, the LED loads or LED drive modules are controlled to be in series connection, and the transistors provided on the series branch circuits are controlled to regulate the current flowing through all the LED loads. Accordingly, on one hand, all the LED loads have a same operating time, on the other hand, all the LED loads operate during most time of every operating cycle, which improves the lifetime of the circuit and the utilization of the LED loads.

Further, by referring to the LED drive circuit, the connection of a plurality of drive modules can be switched between parallel connection and series connection in a similar structure, so that the drive circuit can applicable for driving a large number of LED loads.

The foregoing descriptions of specific embodiments of the present invention have been presented, but are not intended to limit the invention to the precise forms disclosed. It will be readily apparent to one skilled in the art that many modifications and changes may be made in the present invention. Any modifications, equivalence, variations of the preferred embodiments can be made without departing from the doctrine and spirit of the present invention.

The invention claimed is:

1. An LED drive circuit, comprising:
    N+1 LED loads, N isolation elements and a third transistor coupled in series between a high-voltage terminal and a low-voltage terminal of an input port, wherein each of said N isolation elements is coupled between two adjacent LED loads and has a first terminal and a second terminal;
    N first transistors, wherein said first terminals of said N isolation elements are coupled to said low-voltage terminal through said N first transistors, respectively; and
    N second transistors, wherein said second terminals of said N isolation elements are couple to said high-voltage terminal through said N second transistors, respectively, wherein said first transistors and said second transistors are controlled to operate in a linear state, in a conductive state or in an off state to control said N+1 LED loads to be in parallel connection or series connection,
wherein said third transistor is controlled to be operated in a linear state to regulate a current flowing from said high-voltage terminal to said low-voltage terminal when said first transistors and said second transistors are both in said off state;
wherein N is a positive integer number and not less than 1.

2. The LED drive circuit according to claim 1, wherein said third transistor is controlled to be in said conductive state while said first transistors and said second transistors operate in said linear state.

3. The LED drive circuit according to claim 2, wherein said first transistors and said second transistors are controlled to operate in said linear state such that said current flows through each of said LED loads equally.

4. The LED drive circuit according to claim 1, wherein, when an input voltage is greater than a first threshold value but less than a second threshold value, said first transistors and said second transistors are controlled to operate in said linear state or in said conductive state and said third transistor is controlled to be in said conductive state; when said input voltage is greater than said second threshold value, said first transistors and said second transistors are switched to said off state and said third transistor is switched to said linear state.

5. The LED drive circuit according to claim 4, wherein said isolation elements are capacitors;
when said input voltage decreases to be less than said second threshold value, said first transistors, said second transistors and said third transistor are all controlled to operate in said linear state, and current flowing through said first transistors and second transistors is regulated such that the polarity of voltages across said capacitors are gradually reversed and increased to a predetermined value.

6. The LED driver circuit according to claim 5, wherein capacitance values of said capacitors are determined in accordance with operating current when said LED loads are in series connection and desired duration time of series connection in each operating cycle.

7. The LED drive circuit according to claim 1, wherein said isolation elements are capacitors or resistors.

8. The LED drive circuit according to claims 1, wherein said third transistor is coupled in series with one of said LED loads.

9. The LED drive circuit according to claims 1, wherein each of said first transistors is coupled between a first terminal of a corresponding isolation element and an intermediate node; each of said second transistors is coupled between said high-voltage terminal and a second terminal of a corresponding isolation element; said N+1_LED loads and said N isolation elements are coupled between said high-voltage terminal and said intermediate node; and
said third transistor is coupled between said intermediate node and said low-voltage terminal.

10. The LED drive circuit according to claim 1, wherein each of said first transistors is coupled between a first terminal of a corresponding isolation element and said low-voltage terminal; each of said second transistors is coupled between an intermediate node and a second terminal of a corresponding isolation element; said N+1_LED loads and said N isolation elements are coupled between said intermediate node and said low-voltage terminal; and said third transistor is coupled between said high-voltage terminal and said intermediate node.

11. An LED drive circuit, comprising:
N+1 LED drive modules and N module isolation elements being coupled between a high-voltage terminal and a low-voltage terminal of an input port, wherein each of said N module isolation elements is coupled between two adjacent drive modules; N is a positive integer number and not less than 1; and each of said LED drive module comprises M+1 LED loads, the connection of which can be switched between parallel connection and series connection, M is a positive integer number and not less than 1;
N first transistors and N second transistors, wherein said first transistors and said second transistors are controlled to operate in a linear state in a conductive state or both in an off state to control said N+1 LED drive modules to be in parallel connection or series connection; and
a third transistor which is controlled to operate in said linear state in order to regulate a current flowing through said series LED loads when said first transistors and said second transistors are both in said off state and said LED loads of said LED drive modules are in series connection.

12. The LED drive circuit according to claim 11, wherein each of said LED drive modules comprises M fourth transistors and M fifth transistors, and said M fourth transistors and said M fifth transistors are controlled to operate in said linear state, said conductive state or in said off state to control said M LED loads to be in parallel connection or in series connection.

13. The LED drive circuit according to claim 12, wherein said third transistor is controlled to operate in said conductive state when said first transistors and said second transistors operate in said linear state, and/or, said fourth transistors and said fifth transistors operate in said linear state.

14. The LED drive circuit according to claim 13, wherein when an input voltage is greater than a first threshold value but less than a second threshold value, said first transistors and said second transistors are in said conductive state; said fourth transistors and said fifth transistor are controlled to operate in said linear state or said conductive state, and said third transistor is controlled to be in said conductive state;
when said input voltage is greater than said second threshold value but less than a third threshold value, said fourth transistors and said fifth transistors are controlled to operate in said off state, said first transistors and said second transistors are controlled to operate in said linear state, and said third transistor is controlled in said conductive state; and
when said input voltage is greater than said third threshold value, said first transistors, said second transistors, said fourth transistors and said fifth transistors are all switched to said off state and said third transistor is controlled to operate in said linear state.

15. The LED drive circuit according to claim 14, wherein, said module isolation elements are capacitors;
when said input voltage is greater than said third threshold value, said fourth transistors, said fifth transistors and said third transistor are all controlled to operate in said linear state, and current flowing through said fourth transistors and said fifth transistors is regulated such that voltages across said capacitors are gradually reversed and increased to a determined value.

16. The LED driver circuit according to claim 15, wherein capacitance values of said capacitors are determined in accordance with operating current when said LED drive modules are in series connection and desired duration time of series connection in each operating cycle.

17. The LED drive circuit according to claim 11, wherein said first transistors and said second transistors are controlled to operate in said linear state such that current flowing through each of said LED drive module is equal.

18. The LED drive circuit according to claim 11, wherein, said module isolation elements are capacitors or resistors.

19. The LED drive circuit according to claim 11, wherein each of said LED drive modules further comprises:

M load isolation elements, being coupled to an input port of said LED drive module together with said M+1 LED loads, wherein each of said M load isolation elements is respectively coupled between two adjacent LED loads;

each of said fourth transistors is coupled between a first terminal of a corresponding load isolation element and a low-voltage terminal of said input port of said LED drive module; and each of said second transistors is coupled between a high-voltage terminal of said input port of said LED drive module and a second terminal of a corresponding load isolation element.

20. The LED drive circuit according to claim 19, wherein said load isolation elements are capacitors or resistors.

21. The LED drive circuit according to claim 19, wherein said third transistor is coupled in series to one of said LED loads of any of said LED drive modules; or, said third transistor is coupled between said low-voltage terminal of said input port of said LED drive circuit and said low-voltage terminal of said input port of said LED drive module adjacent to said low-voltage terminal of the input port of said LED drive circuit; or said third transistor is coupled between said high-voltage terminal of said input port of said LED drive circuit and said high-voltage terminal of said input port of said LED drive module adjacent to said high-voltage terminal of the input port of the LED drive circuit.

* * * * *